United States Patent
Komeichi et al.

(10) Patent No.: US 10,755,671 B2
(45) Date of Patent: Aug. 25, 2020

(54) DEVICE, METHOD, AND PROGRAM FOR CONTROLLING DISPLAYING OF SURVEY IMAGE

(71) Applicant: TOPCON CORPORATION, Itabashi-ku, Tokyo (JP)

(72) Inventors: Takahiro Komeichi, Tokyo (JP); Tadayuki Ito, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 16/211,296

(22) Filed: Dec. 6, 2018

(65) Prior Publication Data

US 2019/0180714 A1 Jun. 13, 2019

(30) Foreign Application Priority Data

Dec. 8, 2017 (JP) ................. 2017-235895

(51) Int. Cl.
  *G09G 5/02* (2006.01)
  *G06T 3/40* (2006.01)
  *G06T 11/60* (2006.01)
  *G06T 11/00* (2006.01)

(52) U.S. Cl.
  CPC .......... *G09G 5/026* (2013.01); *G06T 3/4038* (2013.01); *G06T 11/001* (2013.01); *G06T 11/60* (2013.01); *G09G 2320/0666* (2013.01); *G09G 2340/0407* (2013.01); *G09G 2340/12* (2013.01)

(58) Field of Classification Search
  None
  See application file for complete search history.

(56) References Cited

U.S. PATENT DOCUMENTS

| 2009/0241358 A1 | 10/2009 | Ohtomo et al. |
| 2010/0256940 A1 | 10/2010 | Ogawa et al. |
| 2012/0218546 A1 | 8/2012 | Ogawa et al. |

(Continued)

FOREIGN PATENT DOCUMENTS

| JP | 2008-268004 A | 11/2008 |
| JP | 2010-151682 A | 7/2010 |

(Continued)

*Primary Examiner* — Tize Ma
(74) *Attorney, Agent, or Firm* — Chiesa Shahinian & Giantomasi PC

(57) ABSTRACT

A technique is provided to facilitate visual recognition of deviations and misalignments in a superposed image. The superposed image is generated by superposing laser scanning point clouds on a panoramic image, which is obtained by stitching base images that are taken from different points of view. The panoramic image can include deviations between the base images. The superposed image can include misalignments between the point cloud image and the panoramic image. A display controlling device for a survey image includes a panoramic image generating unit that generates a panoramic image by stitching multiple still images, an image and point-cloud-image superposing unit that superposes laser scanning point clouds on the panoramic image, and a point-cloud-image transparency adjuster that adjusts a transparency of the image of the laser scanning point clouds to cause the laser scanning point clouds to be visually recognized while the underlying panoramic image is also visually recognized.

7 Claims, 12 Drawing Sheets

(56) References Cited

U.S. PATENT DOCUMENTS

| | | |
|---|---|---|
| 2012/0242785 A1 | 9/2012 | Sasagawa et al. |
| 2012/0242786 A1 | 9/2012 | Sasagawa et al. |
| 2012/0242837 A1 | 9/2012 | Sasagawa et al. |
| 2013/0100114 A1* | 4/2013 | Lynch ................ G01C 21/3638 345/419 |
| 2013/0236107 A1 | 9/2013 | Fukaya et al. |
| 2014/0092207 A1 | 4/2014 | Saito et al. |
| 2016/0260196 A1* | 9/2016 | Roimela ................ G06F 3/013 |
| 2017/0078570 A1 | 3/2017 | Ito et al. |
| 2017/0278304 A1* | 9/2017 | Hildreth ............ G02B 27/0172 |
| 2018/0096525 A1* | 4/2018 | Turner .................... G06T 17/20 |

FOREIGN PATENT DOCUMENTS

| | | |
|---|---|---|
| JP | 2012-204982 A | 10/2012 |
| JP | 2013-186816 A | 9/2013 |
| JP | 2014-071860 A | 4/2014 |
| JP | 2015-118579 A | 6/2015 |
| JP | 2017-058843 A | 3/2017 |
| WO | 2015092977 A1 | 6/2015 |

* cited by examiner

C1: Point of view of first camera (Projection center)

C2: Point of view of second camera (Projection center)

p1: Image coordinate position of point "P"
     in still image that is taken by first camera p2: Image coordinate position of point "P"
     in still image that is taken by second camera P0, P1, P2: Projected position of point "P" on projection sphere surface C1: Point of view of first camera (Projection center)
C2: Point of view of second camera (Projection center)
p1: Image coordinate position of point "P"
   in still image that is taken by first camera
p2: Image coordinate position of point "P"
   in still image that is taken by second camera
P0, P1, P2: Projected position of point "P" on projection sphere surface

DEVICE, METHOD, AND PROGRAM FOR CONTROLLING DISPLAYING OF SURVEY IMAGE

CROSS-REFERENCE TO RELATED APPLICATION

This application is based upon and claims benefit of priority from Japanese Patent Application No. 2017-235895, filed Dec. 8, 2017, the entire contents of which are incorporated herein by reference.

TECHNICAL FIELD

Embodiments described herein relate generally to an image display technique for laser scanning point clouds.

BACKGROUND

A technique of generating three-dimensional data on the basis of images and laser scanning data is publicly known. The images and the laser scanning data may be respectively obtained by a 360-degree spherical camera and a laser scanner, which may be mounted on a vehicle. The images and the laser scanner may be respectively obtained by means of photographing the entirety of the surroundings around the vehicle and laser scanning, while the vehicle travels.

This technique generates a panoramic image and involves various kinds of operations to generate a three-dimensional model by using the panoramic image. Images to be used for surveying are required to have fewer distortions in the images, and therefore, a compound-eye 360-degree spherical camera is likely to be used. In generation of a panoramic image by using a compound-eye 360-degree spherical camera, base images having slightly different points of view are stitched, and thus, a generated panoramic image tends to be blurred at the border between the stitched images. A technique that copes with this problem is disclosed in Japanese Unexamined Patent Application Laid-Open No. 2017-058843, for example.

The technique disclosed in Japanese Unexamined Patent Application Laid-Open No. 2017-058843 involves adjusting a radius of a projection sphere that is set for projecting a panoramic image thereon. The adjustment causes movement of a position at which an object in an image is blurred, thereby solving the blurring of a target object in the image.

Laser scanning point clouds may be superposed on a panoramic image to generate a superposed image, which is very useful in generating a three-dimensional model. However, a photographed image having point clouds superposed thereon makes it difficult to visually recognize blurring of an object in the image as described above.

Moreover, due to the same causes as for the generation of blurring of an object in an image, a photographed image and displayed point clouds can be partially misaligned. The displayed point cloud is referred as a "point cloud image" hereinafter. The displayed point clouds may have colors added to make them conspicuous, but nevertheless, misalignment of the displayed point clouds may be difficult to recognize visually depending on factors of an underlying image, such as color, contrast, and definition.

SUMMARY

In accordance with various embodiments, a technique is provided for facilitating visual recognition of deviations and misalignments in a superposed image. The superposed image is generated by superposing laser scanning point clouds on a panoramic image while adjusting positions of the laser scanning point clouds. The panoramic image is obtained by stitching base images that are photographed from different points of view. Thus, the panoramic image for the superposed image can include deviations between the base images. Also, the superposed image can include misalignments between the point cloud image and the panoramic image.

An embodiment of the invention provides a display controlling device for a survey image, and the display controlling device includes a panoramic image generating unit, a superposing unit, and a point-cloud-image transparency adjuster. The panoramic image generating unit generates a panoramic image by stitching multiple still images having different points of view. The superposing unit superposes an image of a laser scanning point cloud on the panoramic image. The image of the laser scanning point cloud has a specific color. The point-cloud-image transparency adjuster adjusts a transparency of the image of the laser scanning point cloud to cause the laser scanning point cloud to be visually recognized while the panoramic image underlying the image of the laser scanning point cloud is visually recognized through the image of the laser scanning point cloud. Embodiments of the invention can also be understood as relating to a process and to a program.

In accordance with an embodiment of the invention, the display controlling device may further include a color setting unit that sets a specific color in accordance with one or both of differences in reflection intensity of laser scanning points of the laser scanning point cloud and color of the panoramic image at a part on which the laser scanning points are superposed. In another example, the color setting unit may set the specific color in accordance with one or both of differences in distance of laser scanning points of the laser scanning point cloud from a specific position and difference in origin of laser scanning that is performed to obtain the laser scanning points.

In accordance with an embodiment of the invention, the display controlling device may further include an image resolution adjuster that adjusts resolution of the still image at a specific position in the panoramic image. In one example, the display controlling device may further include a point-cloud-image density adjuster that adjusts display density of the laser scanning point cloud at a specific position in the panoramic image. In another example, the point-cloud-image density adjuster may interpolate a virtual scanning point that has a reflection intensity in a specific range, between laser scanning points of the laser scanning point cloud, which have reflection intensities in the specific range.

Embodiments of the invention provide a technique for facilitating visual recognition of deviations and misalignments in a superposed image. The superposed image is generated by superposing laser scanning point clouds on a panoramic image. The panoramic image is obtained by stitching base images that are photographed from different points of view. Thus, the panoramic image for the superposed image can include deviations between the base images. Also, the superposed image can include misalignments between the point cloud image and the panoramic image.

DETAILED DESCRIPTION

Exemplary embodiments of the invention will be described in detail with reference to the accompanying drawings.

Figure 1:
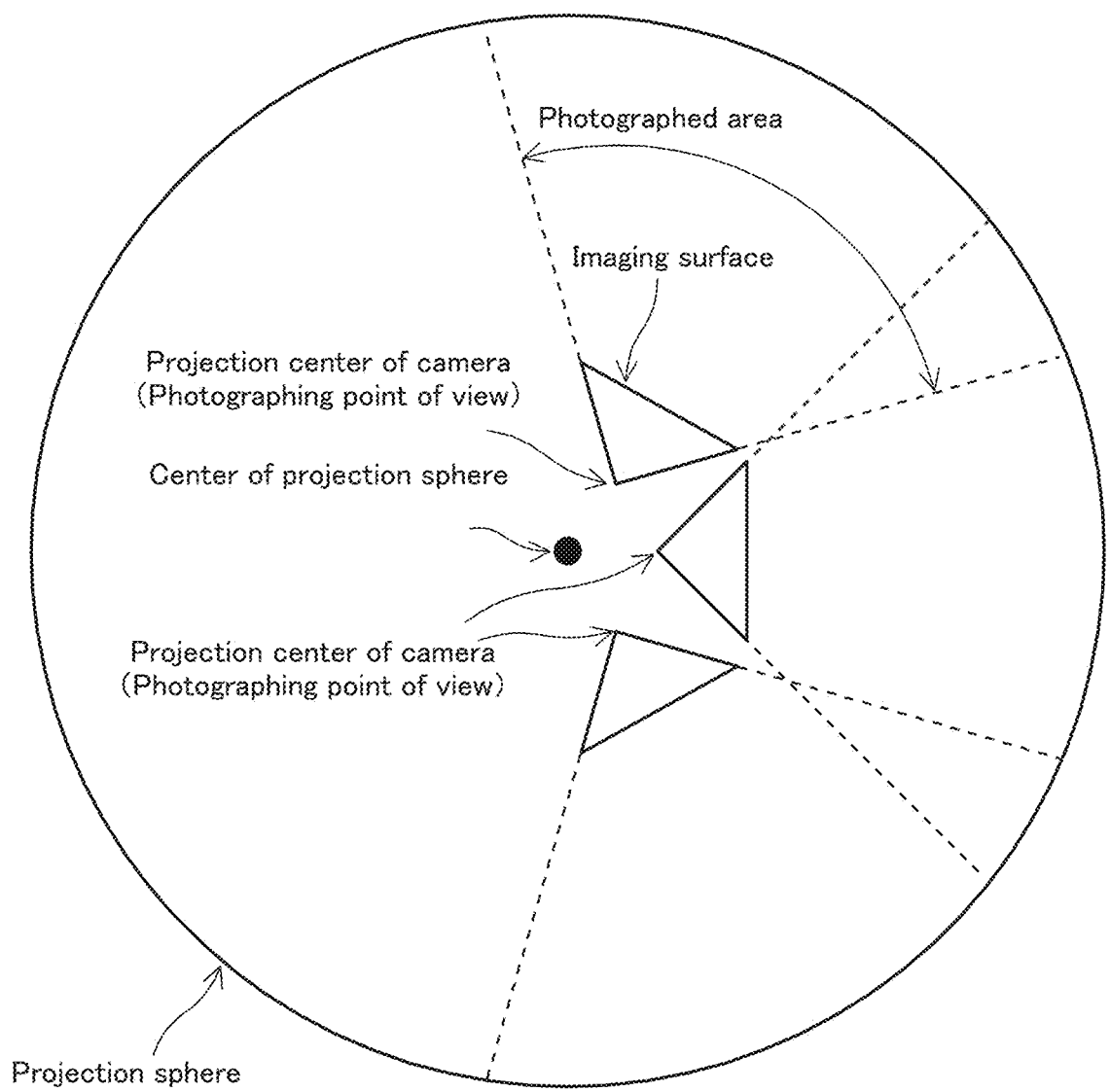
FIG. 1 shows a principle for generating a panoramic image by stitching multiple base images.

Primary Factor of Deviations Between Base Images and Principle for Correcting Deviations First, a problem that arises in a case of stitching multiple base images having different points of view is described. FIG. 1 shows a situation in which three still images are respectively taken from different points of view by three cameras at different positions so as to partially overlap and are projected on an inner circumferential surface of a projection sphere to generate a panoramic image. Normally, a 360-degree spherical camera has a compound-eye structure and is not made by combining individual cameras, but the 360-degree spherical camera can be understood as being equivalent to a camera including multiple cameras in a combined manner. In this embodiment, to facilitate explanation, a case of generating a panoramic image by stitching photographed images taken by three cameras is exemplified. Thus, the principle is the same as in the case of a compound-eye 360-degree spherical camera.

Figure 2:
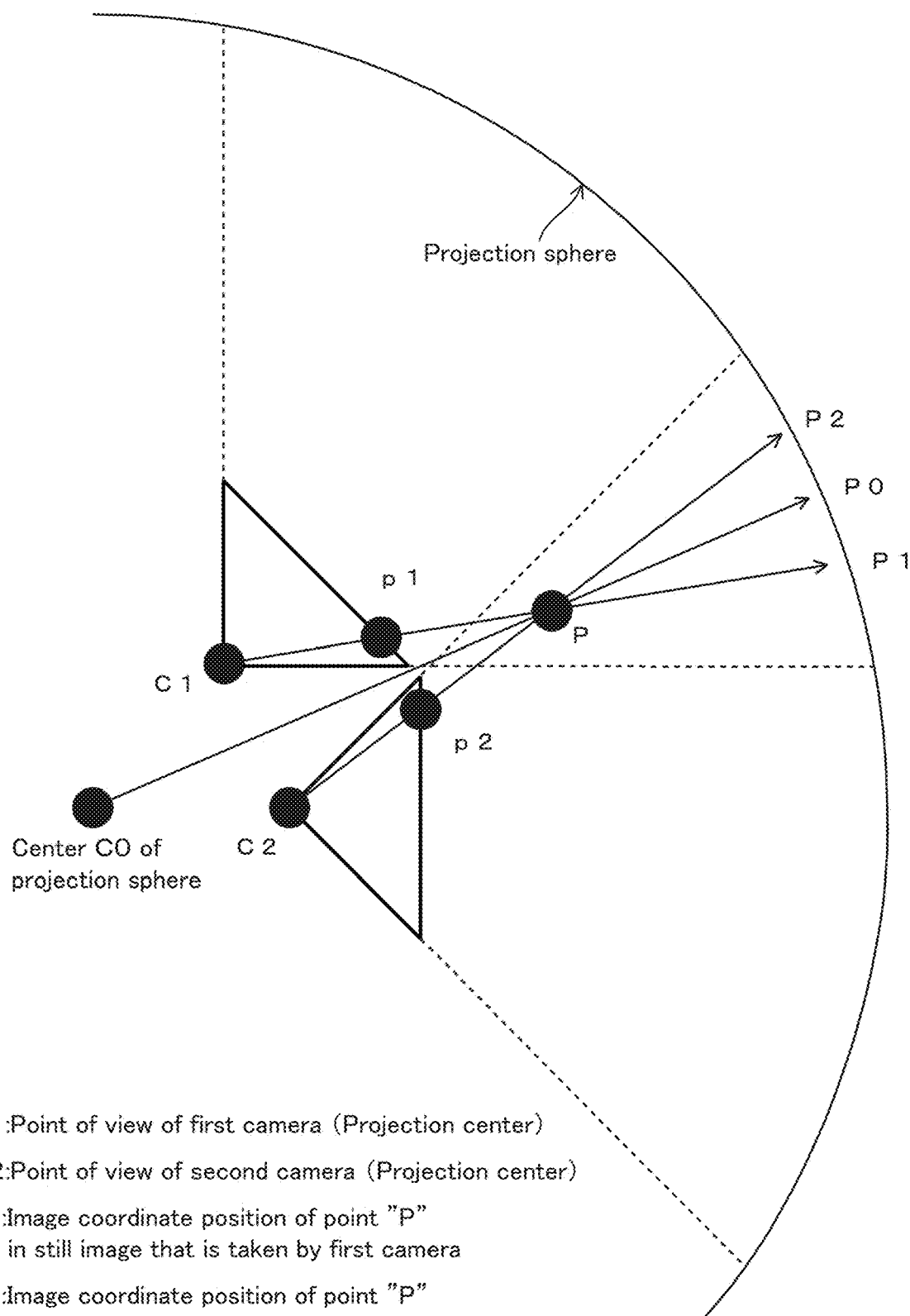
FIG. 2 shows a principle for generating image deviations.

FIG. 2 shows a situation in which a first camera at a point of view C1 and a second camera at a point of view C2 photograph the position of a point "P". In this case, the point of view C1 does not coincide with the point of view C2, and the point of view C1 and the point of view C2 also do not coincide with a center C0 of a projection sphere for generating a panoramic image. Under these conditions, the point "P" is positioned at a position p1 in the photographed image taken by the first camera, and the point "P" is positioned at a position p2 in the photographed image taken by the second camera.

First, a case of stitching photographed images taken by the two cameras is described. In this case, the positions p1 and p2 are projected on a surface of the projection sphere. Specifically, a directional line is set connecting the point of view C1 and the position p1, and a point at which the directional line intersects the projection sphere is a projected position P1 of the position p1 on the projection sphere. Similarly, a directional line is set connecting the point of view C2 and the position p2, and a point at which the directional line intersects the projection sphere is a projected position P2 of the position p2 on the projection sphere.

In this case, ideally, the image of the point "P" as viewed from the point of view C0 should be shown at a position P0 on the projection sphere in a generated panoramic image. However, the point "P" is shown at the position P1 in a panoramic image based on the photographed image taken by the first camera, whereas the point "P" is shown at the position P2 in a panoramic image based on the photographed image taken by the second camera. Thus, the point "P" is shown at incorrect positions and appears to be blurred as two points in the generated panoramic image.

Figure 14:
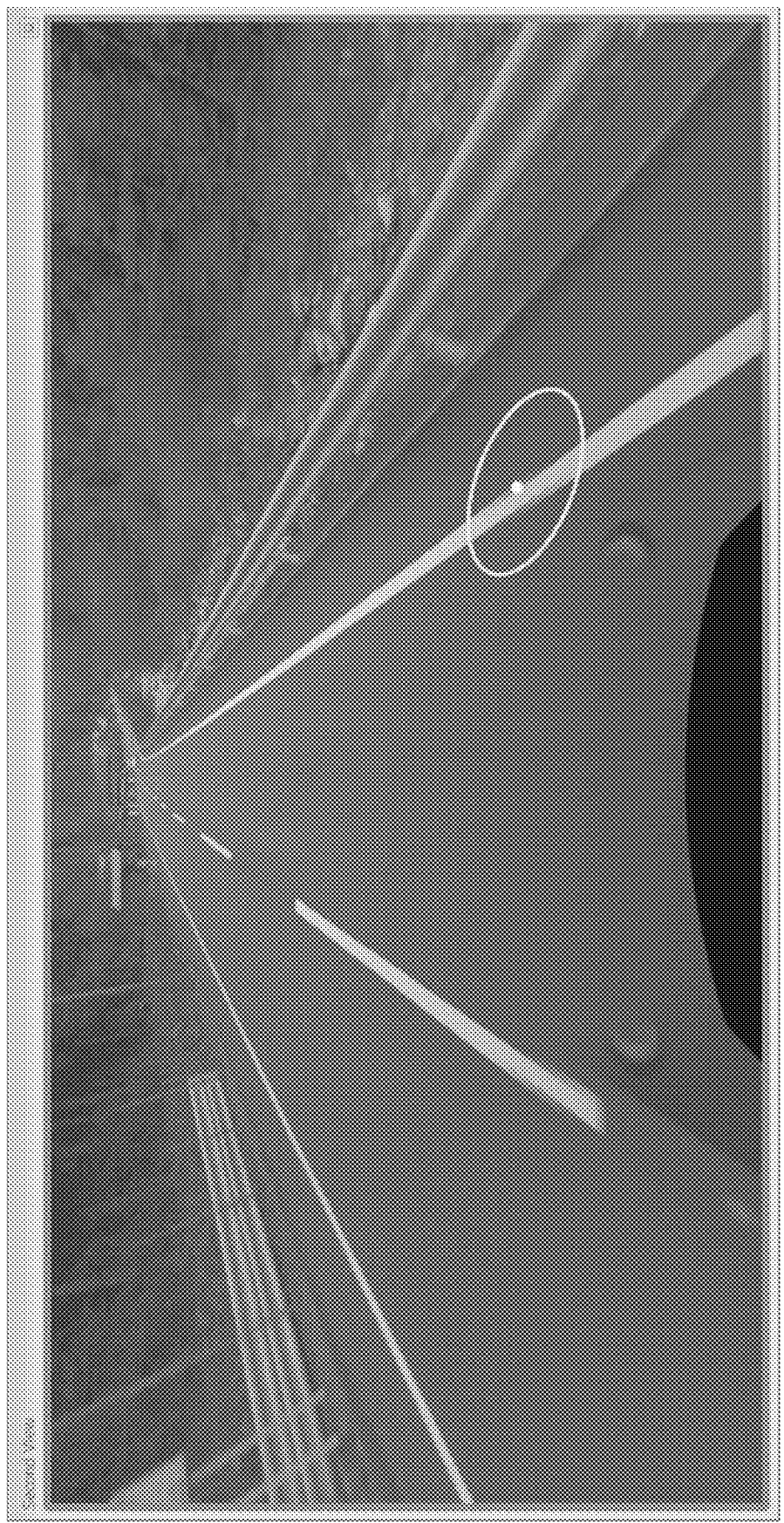
FIG. 14 is a view showing an example of a panoramic image.

Due to this phenomenon, deviations occur in the generated panoramic image. Moreover, distortions occur in the entirety of the generated panoramic image due to difference in point of view. FIG. 14 is a view showing an example of a panoramic image in which this phenomenon occurs. The panoramic image shown in FIG. 14 contains deviations at a part of an outside line surrounded by a circle. The outside line is a white line, for example. These deviations are caused by the phenomenon, which is described by referring to FIG. 2, such that the image that should be viewed at the position P0 is shown at the positions P1 and P2. This phenomenon occurs due to the noncoincidence of the positions of the points of view C1 and C2 with the center C0 of the projection sphere.

Figure 3:
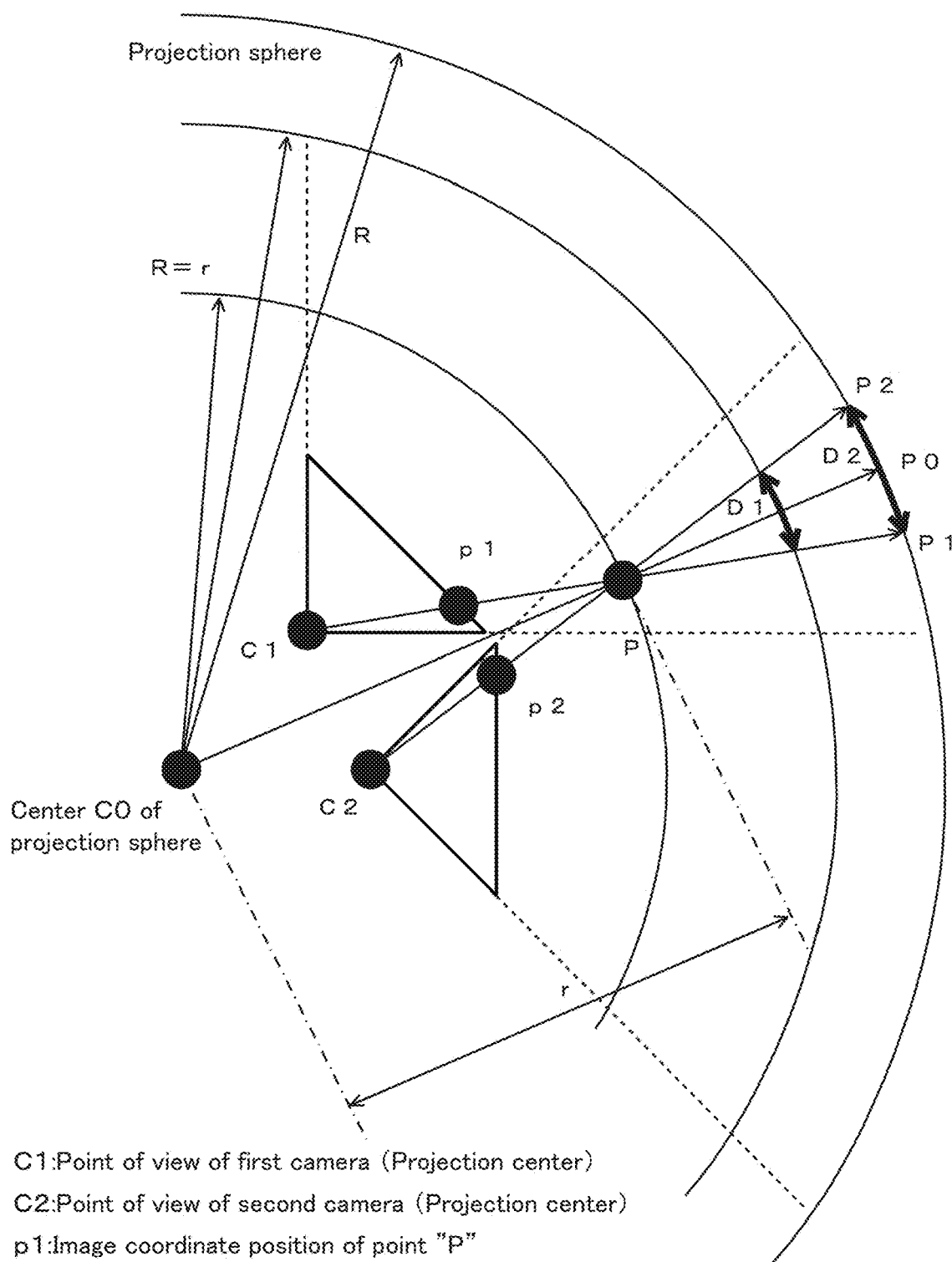
FIG. 3 shows a condition for avoiding image deviations.

FIG. 3 is a conceptual diagram showing the principle for correcting the above-described deviation. FIG. 3 shows a situation in which a radius "R" of the projection sphere is made variable in the condition shown in FIG. 2. In this case, each of reference symbols D1 and D2 represents a difference between the projected position P1 and the projected position P2. The projected position P1 is obtained on the basis of the photographed image taken by the first camera. The projected position P2 is obtained on the basis of the photographed image taken by the second camera. As shown in FIG. 3, by varying the radius "R" of the projection sphere, a difference "D" between the projected positions varies accordingly. The differences D1 and D2 can be understood as a deviation width of an object in a generated panoramic image.

Figure 10:
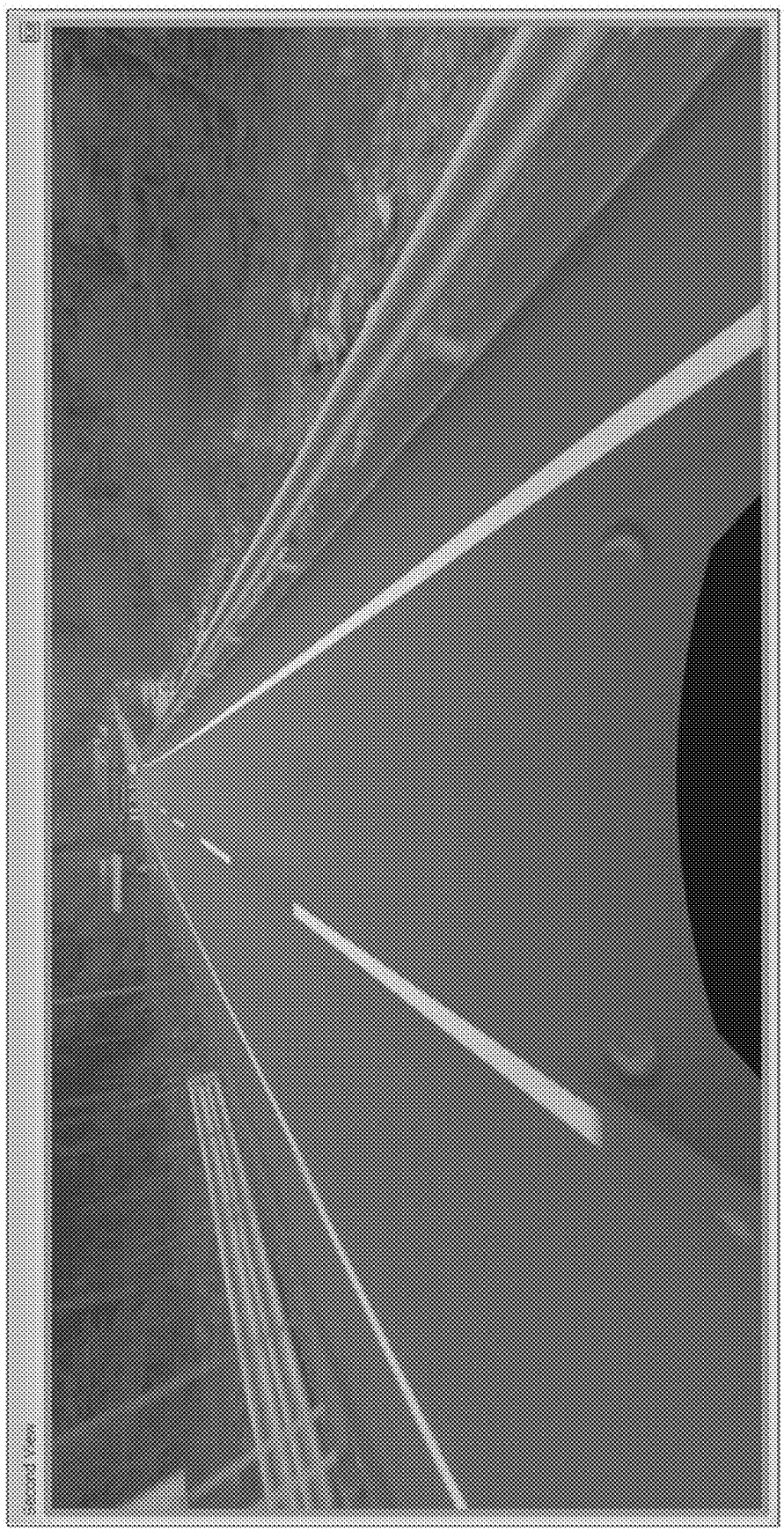
FIG. 10 is a view showing an example of a panoramic image.

The variation in the difference "D" in accordance with the variation in the radius "R" can be viewed in a real image. FIG. 10 shows a panoramic image in a case of varying a radius of a projection sphere from a radius in the case shown in FIG. 14. FIG. 10 shows an outside line with no deviation, which exists in the case in FIG. 14. This is because the projection radius R is appropriately selected so that the distance D will be zero at the corresponding part of the outside line. Although not clearly shown in FIG. 10, the distance D cannot be zero at every position in the panoramic image because distances to target objects vary, and thus, deviations and blurring can occur at some positions in the panoramic image.

As shown in FIG. 3, by making the radius "R" of the projection sphere coincide with a distance "r" between the center C0 of the projection sphere and the point "P", that is, by setting radius "R"=distance "r", the difference "D" is made zero. Under these conditions, the positions of the points P1, P2, and P0 coincide with each other, and deviations in the panoramic image are corrected. To set radius "R"=distance "r", the distance "r" must be calculated. Normally, the distance "r" is not fixed in a panoramic image, but differs depending on the position in the panoramic image. Thus, the radius "R" cannot be the distance "r" at every position in the panoramic image, and deviations can occur at some positions in the panoramic image.

In this embodiment, the distance "r" is obtained from three-dimensional point cloud data of laser scanning data. The procedure for calculating the distance "r" is described below. First, a point "P" is selected. Then, data of three-dimensional coordinates of the point "P" is obtained from three-dimensional point cloud data containing the point "P". Next, the distance "r" is calculated on the basis of position data of the center C0 of the projection sphere and the three-dimensional position data of the point "P". Thereafter, the radius "R" is set so that radius "R"=distance "r", and multiple images relating to the point "P" are stitched on a projection sphere to generate a panoramic image. This processing corrects deviations at the position of the point "P" in the panoramic image.

Overview of Embodiments

The primary factors for the deviations of an object in the panoramic image are as described above. Moreover, misalignments can occur between photographed images for the panoramic image and an image of laser scanning point clouds that are projected on the panoramic image. This is because the laser scanning point cloud can be arithmetically converted into three-dimensional coordinate data that has the origin at the center of the projection sphere, whereas a point of view for photographing of the photographed image does not coincide with the center of the projection sphere. The misalignments between the photographed images and the laser scanning point clouds can also be corrected by varying the radius "R". Note that, as in the case of stitching photographed images, misalignments cannot be corrected at every position in a panoramic image. That is, misalignments at a target position are corrected while misalignments occur at other positions.

Figure 11:
FIG. 11 is a view showing an example of a superposed panoramic image that is generated by superposing a point cloud image on photographed images.

The misalignments between the photographed images and the point cloud image in the superposed panoramic image are visually recognized in the superposed panoramic image shown in FIG. 11, for example. FIG. 11 shows a superposed panoramic image in FIG. 14, on which an image of laser scanning point clouds is superposed. FIG. 11 shows misalignments between an outside line and laser scanning points of the point cloud image, at a front side of the outside line in the drawing. The laser scanning points are indicated by dots in FIG. 11 and represent reflection points from the outside line. The laser scanning points may be colored in accordance with reflection intensity of scanning light in FIG. 11 when actually used.

In the case in which the laser scanning points of the scanning point clouds are conspicuously displayed as shown in FIG. 11, the deviations between the photographed images, which are shown in FIG. 14, are difficult to visually recognize. This phenomenon is obvious in FIG. 11, and the deviations at the part of the outside line, which are shown in FIG. 14, are difficult to visually recognize in FIG. 11. Thus, the deviations between the photographed images and the misalignments between the photographed images and the point cloud image are difficult to recognize at the same time, and one kind of the deviations and the misalignments are easy to see, but others are difficult to see.

Figure 12:
FIG. 12 is a view showing an example of a superposed panoramic image that is generated by superposing a point cloud image on photographed images.
Figure 13:
FIG. 13 is a view showing an example of a superposed panoramic image that is generated by superposing a point cloud image on photographed images.

To solve this problem, this embodiment uses a function of making the point cloud image semitransparent and varying the degree of the semitransparent state. The semitransparent state is a state in which the photographed image underlying the point cloud image is viewed through the point cloud image, whereby the underlying photographed image and the point cloud image are viewed at the same time. FIG. 11 shows a case in which a transparency of the point cloud image is 0%. FIG. 12 shows a case in which the transparency is 65%. FIG. 13 shows a case in which the transparency is 85%.

Configuration of Hardware

Figure 4:
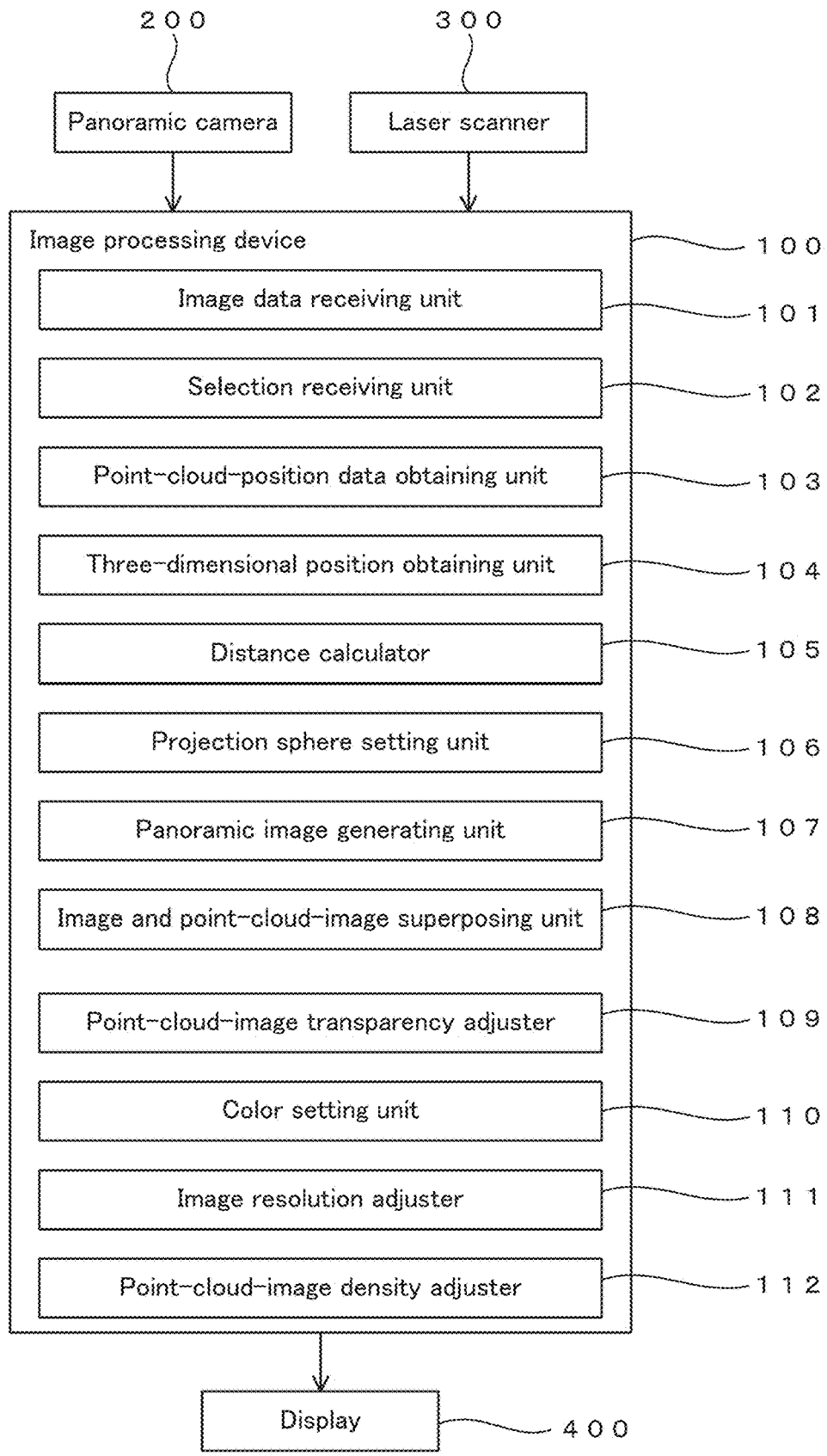
FIG. 4 is a block diagram of an embodiment.

FIG. 4 shows a block diagram of an embodiment of the invention. More specifically, FIG. 4 shows an image processing device 100, a 360-degree spherical camera 200, a laser scanner 300, and a display 400. The image processing device 100 functions as a computer and has functional units described below. The 360-degree spherical camera 200 is a multi-eye camera for photographing in all directions and can photograph in the overhead direction and the entire 360 degrees of the surroundings. In this embodiment, the 360-degree spherical camera 200 is a six-eyed camera and is equivalent to having six cameras. Five of the six cameras are directed in a horizontal direction and are arranged at positions at an equal angle of 72 degrees as viewed downwardly from a vertical direction. The other camera is directed in the vertical upward direction at elevation angle of 90 degrees. The six cameras are arranged so that their view angles of the photographed areas partially overlap. Still images are obtained by the six cameras, and the still images are stitched to obtain a panoramic image.

Relative positional relationships and relative directional relationships between each of the cameras of the 360-degree spherical camera 200 are preliminarily examined and are therefore already known. Additionally, the positions of the points of view or the positions of the projection centers, of the six cameras do not coincide with each other due to physical limitation. Details of a 360-degree spherical camera are disclosed in Japanese Unexamined Patent Applications Laid-Open Nos. 2012-204982 and 2014-071860, for example. A commercially available 360-degree spherical camera may be used as the 360-degree spherical camera 200. As one example, the commercially available 360-degree spherical camera may include a camera named "Ladybug3", produced by Point Grey Research, Inc. Other examples suitable for use with the disclosed embodiments will also be apparent to those skilled in the art.

Alternatively, instead of the 360-degree spherical camera, a camera that is equipped with a rotary structure may be used for taking multiple still images in different photographing directions, and these multiple still images may be stitched to obtain a panoramic image. Naturally, the panoramic image is not limited to an entire circumferential image and may be an image that contains the surroundings in a specific angle range. The 360-degree spherical camera 200 takes multiple still images from different directions, and the data of the multiple still images is transmitted to the image processing device 100.

The six cameras take still images at the same time at specific timings. The photographing of each of the six cameras can also be performed at a specific time interval. For example, the six cameras may be sequentially operated at a specific time interval for taking images, and the obtained images are stitched to generate an entire circumferential image. Alternatively, a moving image may be taken. In the case of taking a moving image, frame images constituting the moving image, for example, frame images that are taken at a rate of 30 frames per second, are used as still images.

The laser scanner 300 emits laser light on an object and measures the laser light that is reflected back from the object, thereby measuring the direction and the distance to the object. At this time, on the condition that exterior orientation parameters (position and attitude) of the laser scanner 300 are known, three-dimensional coordinates in an absolute coordinate system of a reflection point that reflects back the laser light are determined. Even when the absolute position of the laser scanner 300 is unknown, three-dimensional point cloud position data in a relative coordinate system is obtained. The laser scanner 300 includes an optical part having a laser emitting unit and a reflected light receiving unit. While rotating the optical part, the laser scanner 300 emits the laser light for measuring a distance, to the surroundings and measures the laser light reflected back from the surroundings to perform laser scanning in the same area as the photographed area of the 360-degree spherical camera 200. Details of a laser scanner are disclosed in Japanese Unexamined Patent Applications Laid-Open Nos. 2008-268004 and 2010-151682, for example. Other examples suitable for use with the disclosed embodiments will also be apparent to those skilled in the art.

A positional relationship and a directional relationship between the laser scanner 300 and the 360-degree spherical camera 200 are preliminarily obtained and are already known. The coordinate system of point cloud position data that is obtained by the laser scanner 300 may be an absolute coordinate system or a relative coordinate system. The absolute coordinate system describes positions that are measured by using a GNSS or other device. The relative coordinate system is a local coordinate system that describes a mechanical center of the 360-degree spherical camera 200 or another appropriate position as an origin.

In the case of using the absolute coordinate system, position information of the 360-degree spherical camera 200 and the laser scanner 300 is obtained by a means such as a GNSS. In a condition in which the position information of the 360-degree spherical camera 200 and the laser scanner 300 cannot be obtained, a relative coordinate system that uses a structural center of gravity of the 360-degree spherical camera 200 or other position as an origin is set. This relative coordinate system is used to describe the positional relationship and the directional relationship between the laser scanner 300 and the 360-degree spherical camera 200 and describe three-dimensional point cloud position data that is obtained by the laser scanner 300.

The display 400 is an image display device such as a liquid crystal display. The display 400 may use a tablet or a display of a personal computer. The display 400 receives data of images that are processed by the image processing device 100 and displays the images.

FIG. 4 shows each functional unit equipped on the image processing device 100. The image processing device 100 includes a CPU, various kinds of storage units such as an electronic memory and a hard disk drive, various kinds of arithmetic circuits, and interface circuits, and the image processing device 100 functions as a computer that executes functions as described below.

The image processing device 100 includes an image data receiving unit 101, a selection receiving unit 102, a point-cloud-position data obtaining unit 103, a three-dimensional position obtaining unit 104, a distance calculator 105, a projection sphere setting unit 106, a panoramic image generating unit 107, an image and point-cloud-image superposing unit 108, a point-cloud-image transparency adjuster 109, a color setting unit 110, an image resolution adjuster 111, and a point-cloud-image density adjuster 112. In this embodiment, the image processing device 100 is implemented by using a personal computer. That is, application software for implementing each of the functional units, such as an operation program, is installed in the personal computer, and the personal computer is operated as the image processing device 100 by starting the application software.

These functional units may be constructed of software, for example, may be constructed so that programs are executed by a CPU, or may be composed of dedicated arithmetic circuits. In addition, a functional unit that is constructed of software and a functional unit that is composed of a dedicated arithmetic circuit may be used together. For example, each of the functional units shown in FIG. 4 is composed of an electronic circuit of one of a central processing unit (CPU), an application specific integrated circuit (ASIC), and a programmable logic device (PLD) such as a field programmable gate array (FPGA) or is composed of a combination thereof.

The following describes each of the functional units equipped on the image processing device 100. The image data receiving unit 101 receives data of the still images that are taken by the 360-degree spherical camera 200. Specifically, the image data receiving unit 101 receives data of the still images that are taken by the six cameras equipped on the 360-degree spherical camera 200.

The selection receiving unit 102 receives selection of a target point in a stitched image that is generated by the panoramic image generating unit 107. In this embodiment, the stitched image is a panoramic image. For example, two still images that contain the same object may be stitched to generate a panoramic image, and the generated panoramic image may be displayed on a display of a personal computer (PC). In this condition, a user may control a graphical user interface (GUI) of the PC and may select a target point at which the image is to be subjected to processing to decrease deviations. Specifically, the user may move a cursor to a target point and may click a left button, thereby selecting the target point. The image position of the target point that is selected with the cursor is obtained by a function of the GUI.

The point-cloud-position data obtaining unit 103 takes point cloud position data in the image processing device 100 from the laser scanner 300. Although the point cloud position data is measured by the laser scanner 300 in this embodiment, the point cloud position data may instead be obtained from stereoscopic images as will be appreciated by those skilled in the art. Details of a technique for obtaining point cloud position data using stereoscopic images are disclosed in Japanese Unexamined Patent Application Laid-Open No. 2013-186816, for example.

The three-dimensional position obtaining unit 104 obtains a three-dimensional position of the selected target point, which is received by the selection receiving unit 102, on the basis of the point cloud position data. Hereinafter, this process is described. The three-dimensional point cloud position of the target point is obtained by using a superposed image in which the three-dimensional point cloud position data is superposed on the panoramic image. The superposed image is generated by the image and point-cloud-image superposing unit 108, which is described later. First, the superposed image, in which the three-dimensional point cloud position data is superposed on the panoramic image, is described.

The point cloud position data provides three-dimensional coordinates of each of the laser scanning points. That is, on the condition that the center of the projection sphere, such as C0 in FIGS. 2 and 3, is determined, the direction from the determined center of the projection sphere to each of the laser scanning points is also determined. Thus, by projecting each point of point clouds on an inner circumferential surface of a projection sphere, a point cloud image that has a point image of each of the laser scanning points at the projected positions, that is, a two-dimensional image composed of the point clouds, is generated. The point cloud image is composed of numerous points and can be used in the same way as an ordinary still image.

The relative positional relationship and the relative directional relationship between the 360-degree spherical camera 200 and the laser scanner 300 are preliminarily obtained and are already known. Thus, the point cloud image can be superposed on the still images that are taken by the six cameras of the 360-degree spherical camera 200 in the same manner as the method of stitching the images taken by the six cameras of the 360-degree spherical camera 200. This process for generating the superposed image is performed by the image and point-cloud-image superposing unit 108.

The following describes an example of a method for generating a superposed image according to an embodiment of the invention. First, a center of a projection sphere is set. The center of the projection sphere is set at a mechanical center or a center of gravity of the multi-eye structure of the 360-degree spherical camera 200 or at an average position of optical origins or centers of projection of the cameras constituting the 360-degree spherical camera 200. The center of the projection sphere may also be set at other position. The position for the center of the projection sphere is freely selected, and a position that enables easy processing of data and that is less prone to generate a measurement error is selected.

In the condition that three-dimensional coordinates of the center of the projection sphere are determined, coordinates of each point of the laser scanning point clouds are described in a coordinate system having the origin at the center of the projection sphere. Thus, a direction of each point of the laser scanning point clouds as viewed from the center of the projection sphere is determined, whereby the laser scanning point clouds are projected on the inner circumferential surface of the projection sphere. Moreover, with use of a function of the panoramic image generating unit 107, a still image taken by each of the cameras of the 360-degree spherical camera 200 is projected on an inner circumferential surface of a projection sphere with a radius "R", and a panoramic image is generated by stitching multiple still images while partially overlapping them. The projection sphere with the radius "R" is set by the projection sphere setting unit 106. In this embodiment, still images taken by six cameras of the 360-degree spherical camera 200 are projected, and a panoramic image is generated by stitching the six still images. The panoramic image generating unit 107 is described later.

Thereafter, the laser scanning point clouds that are projected on the inner circumferential surface of the projection sphere are superposed on the panoramic image that is composed of the photographed images. As a result, the laser scanning point clouds that are obtained by the laser scanner 300 are superposed on the photographed images taken by the 360-degree spherical camera 200, whereby a superposed panoramic image is obtained. FIGS. 11 to 13 show examples of superposed panoramic images in which the point cloud image is superposed on the photographed images.

The superposed image in which the point cloud image is superposed on the photographed images is used for obtaining a three-dimensional position of the target point, which is received by the selection receiving unit 102, on the basis of the point cloud position data. Specifically, a point of the point cloud position data, which corresponds to the image position in the panoramic image of the target point that is received by the selection receiving unit 102, is obtained from the superposed image. Then, a three-dimensional coordinate position of this point is obtained from the point cloud position data that is obtained by the point-cloud-position data obtaining unit 103. Otherwise, if there is no point that corresponds to the target point, the three-dimensional coordinates of the target point are obtained by a method such as one of the following methods. One method is selecting a point in the vicinity of the target point and obtaining the three-dimensional position thereof. Another method is selecting multiple points in the vicinity of the target point and obtaining an average value of the three-dimensional positions thereof. Another method is preselecting multiple points in the vicinity of the target point, finally selecting multiple points, of which three-dimensional positions are close to the target point, from among the preselected multiple points, and obtaining an average value of the three-dimensional positions of the finally selected points. The process for obtaining the three-dimensional position of the target point is performed by using the superposed image, in which the point cloud image is superposed on the photographed images, by the three-dimensional position obtaining unit 104.

The distance calculator 105 calculates a distance between the three-dimensional position of the target point, which is obtained by the three-dimensional position obtaining unit 104, and the center of the projection sphere. The projection sphere is set by the projection sphere setting unit 106 to generate a stitched image, which is a panoramic image, by the panoramic image generating unit 107. For example, the distance "r" in FIG. 3 is calculated by the distance calculator 105.

The center of the projection sphere is, for example, set at a known position. The relative exterior orientation parameters (position and attitude) of the laser scanner 300 and each of the cameras of the 360-degree spherical camera 200 are preliminary obtained and are already known. Thus, the position of the center of the projection sphere and the three-dimensional position of the target point, which is obtained by the three-dimensional position obtaining unit 104, are described by using the same coordinate system. Therefore, the distance, for example, the distance "r" in FIG. 3, between the three-dimensional position of the target point, which is obtained by the three-dimensional position obtaining unit 104, and the center of the projection sphere, which is set by the projection sphere setting unit 106, is calculated.

The projection sphere setting unit 106 sets a projection sphere that is necessary for generating a panoramic image. Hereinafter, the function of the projection sphere setting unit 106 is described with reference to FIG. 3. As shown in FIG. 3, the projection sphere is a virtual projection surface having a predetermined known position as its center and having a spherical shape with a radius "R". Six still images, which are respectively taken by the six cameras of the 360-degree spherical camera 200, are projected on the projection surface so as to be stitched, thereby generating a panoramic image that is projected on the inside of the projection sphere. As described above, the center of the projection sphere is set at the mechanical center or the center of gravity of the multi-eye structure of the 360-degree spherical camera 200 or at the average position of the optical origins or the centers of projection of the cameras constituting the 360-degree spherical camera 200. However, the center of the projection sphere may also be set at another position.

The essential function of the projection sphere setting unit 106 is to vary the radius "R" of the projection sphere. This function is described below. First, before the selection receiving unit 102 receives selection of a specific position in the image on the display, the projection sphere setting unit 106 selects a predetermined initial set value for the radius "R" and sets a projection sphere. The initial set value for the radius "R" may be, for example, a value from several meters to several tens of meters, or it may be infinity.

After the selection receiving unit 102 receives selection of a specific position of a target point in the image on the display, the projection sphere setting unit 106 sets the radius "R" of the projection sphere in accordance with the distance "r" between the target point and the center of the projection sphere. In this embodiment, the process is performed so that radius "R"=distance "r". Although the radius "R" may not necessarily be made equal to the distance "r", the radius "R" is preferably made close to the value of the distance "r" as much as possible. For example, the radius "R" is made to coincide with the value of the distance "r" at an accuracy of not greater than plus or minus 5%.

The distance calculator 105 calculates the distance "r" in real time. The projection sphere setting unit 106 also calculates the radius "R" in real time in accordance with the distance "r" that is calculated in real time. For example, when a user changes the position of the target point to be received by the selection receiving unit 102, and the distance calculator 105 recalculates the distance "r", the projection sphere setting unit 106 also recalculates the radius "R" so that radius "R"=distance "r" correspondingly.

The panoramic image generating unit 107 projects the still images, which are respectively taken by the cameras of the 360-degree spherical camera 200, on the inner circumferential surface of the projection sphere having the radius "R", which is set by the projection sphere setting unit 106. In this embodiment, the six cameras of the 360-degree spherical camera 200 take still images. Then, the panoramic image generating unit 107 generates a panoramic image that is made of the six still images, which are stitched so as to partially overlap.

In this structure, as shown in FIG. 3, when a specific position is selected for the target point "P" in the panoramic image, the distance "r" is calculated, and the process is performed so that radius "R"=distance "r". As a result, the radius "R" of the projection sphere dynamically varies correspondingly to the variation in the distance "r" due to the positional change of the target point "P".

The point-cloud-image transparency adjuster 109 adjusts the transparency of the laser scanning point clouds displayed on the display. The transparency is adjusted by varying an alpha value of each point constituting the laser scanning point clouds. As the transparency of the point cloud image is increased, the image underlying the laser scanning point clouds is more clearly visible. Conversely, as the transparency of the point cloud image is decreased, the image underlying the laser scanning point clouds is less clearly visible.

The color setting unit 110 selects colors of the points of the laser scanning point clouds. The colors of the points are selected on the basis of (1) difference in reflection intensity of the laser scanning points, (2) color of the image underlying the laser scanning points, (3) difference in distance of the laser scanning points from a specific position, (4) difference in the origin of the laser scanning, and (5) a combination of any of (1) to (4). In addition, a selected color may be added to a point cloud.

On the basis of (1), colors are assigned to the points depending on the reflection intensities of the points. On the basis of (2), a color that is easy to distinguish from the color of the image underlying the point is selected. For example, a complementary color is selected. It is also effective to consider the references (1) and (2) in combination. In the case of selecting a color on the basis of (1) or (2) or both, the relationship between the point cloud image and the underlying photographed image is easy to identify, and in particular, misalignments between the point cloud image and the underlying photographed image are made easy to visually recognize.

The reference (3) is used in a case of adding a color depending on a distance of a laser scanning point from the laser scanner and in a case of adding a color depending on an altitude of a laser scanning point. The reference (4) is used, in a case of using multiple laser scanners, to change colors of laser scanning points with respect to each of the laser scanners. The reference (4) is also used, in a case of performing the laser scanning during traveling, to change colors of laser scanning points depending on the location the laser scanning is performed.

These references for setting colors are preferably appropriately changed or combined by operation by a user. The colors are selected primarily to facilitate understanding of the relationship between the point cloud image and the photographed image that is displayed under the point cloud image. The colors and the states of the point clouds and the photographed images have variations. Thus, the color of the point cloud image is preferably selected or adjusted by a user so that the relationship between the point cloud image and the underlying photographed image at a target position will be easily recognized.

The image resolution adjuster 111 adjusts resolution of the photographed image at a position or a region, which is selected in the display by a user. The setting of the resolution is selected by a user. The greater the resolution of the entirety of the panoramic image, the greater the burden of calculation in the image processing, resulting in delay in the processing speed, generation of a calculation error, unintentional intermittency of the calculation, and other problems. However, by decreasing the resolution of the entity of the panoramic image while varying the resolution only at a part selected by a user, the resolution of the photographed image at the part selected by the user is increased while suppressing the increase in the burden of the calculation.

The point-cloud-image density adjuster 112 adjusts display density of the laser scanning point clouds at a specific position in the superposed panoramic image. This adjustment increases the density of the point clouds in a region in which the density of the displayed laser scanning point clouds is low due to laser scanning of low density. Specifically, a virtual scanning point that has a reflection intensity in a predetermined range is interpolated in a space between adjacent laser scanning points having reflection intensities in the predetermined range.

This process facilitates visual recognition of a part that have the laser scanning points at a low density and that is not conspicuous as a point cloud image. For example, laser scanning points of an outside line on a road in FIG. 11 are selected. As shown in FIG. 11, an apparent width of a distant part of the outside line is narrow in the superposed panoramic image on the display, and thus, the density of the laser scanning points is high, whereas the density of the laser scanning points near the point of view in the front side in the superposed panoramic image looks low. Under these conditions, to increase the display density of the point clouds at the part at which the density of the laser scanning points of the outside line is low, assuming that a scanning point having the same reflection point is supposed to be obtained at a space between adjacent laser scanning points having the same reflection intensity, a virtual scanning point having the same color as the adjacent laser scanning points is added in the space. The number of the virtual scanning points to be added in the space between the laser scanning points, which are actually measured, is set so that the display density of the laser scanning points will be a predetermined value or greater.

The interpolation of the displayed laser scanning points facilitates visual recognition of the point cloud image of which the display density of the laser scanning points is low. The interpolation of the displayed laser scanning points is effective for visually clearly recognizing a relationship between the underlying photographed image and the point cloud image, in particular, a boundary such as an edge of an object in the superposed panoramic image. The interpolated point is not a point of which the three-dimensional coordinates are actually measured, and therefore, the interpolated point is preferably used to help visual recognition of the displayed image or is preferably used to set a radius of a projection sphere for a part having no measured point.

Example of Processing—Control of Radius of Projection Sphere

Figure 5:
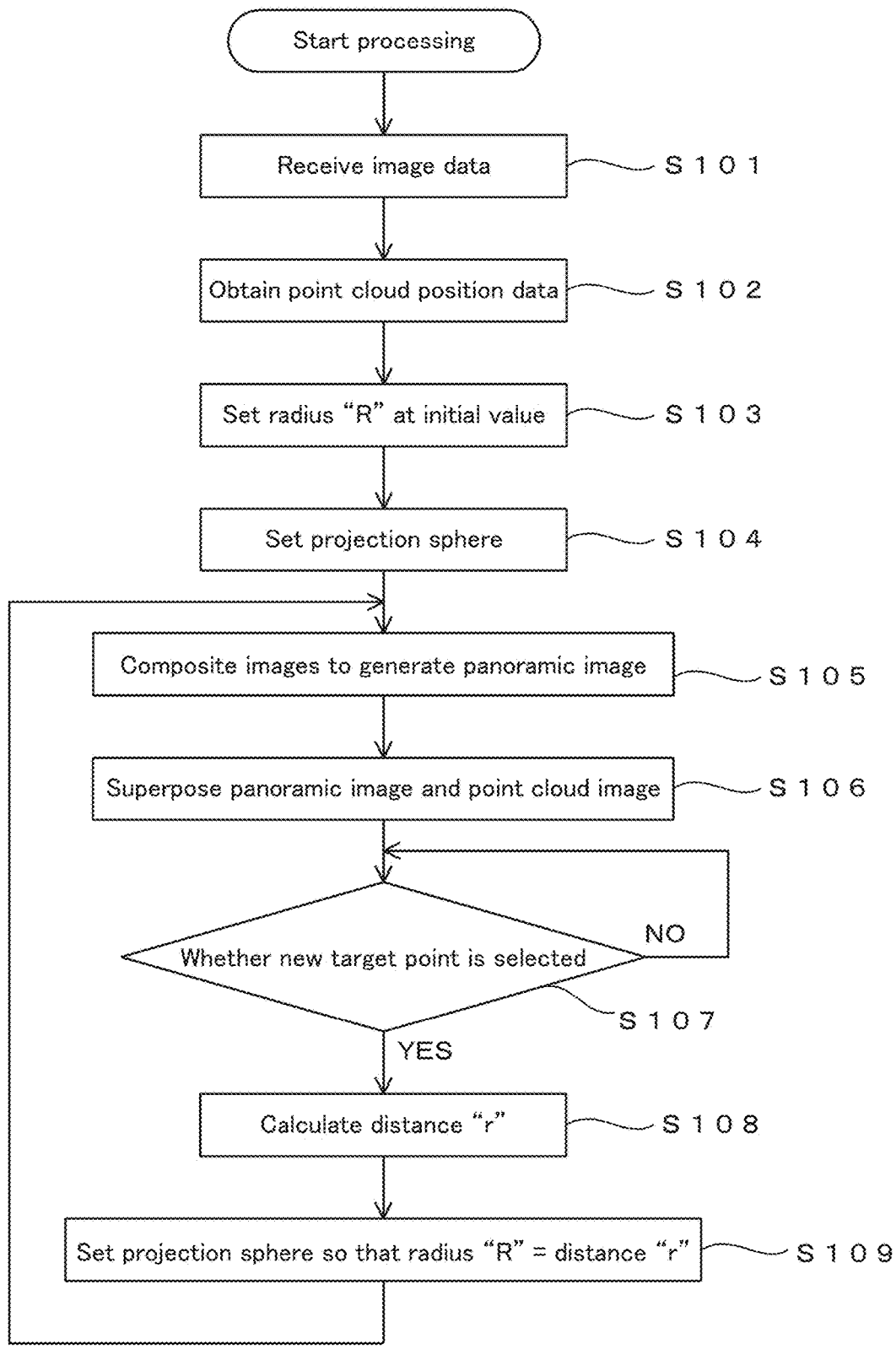
FIG. 5 is a flowchart showing an example of a processing procedure.

The following describes an example of a procedure of processing that is executed by the image processing device 100 shown in FIG. 4. FIG. 5 is a flowchart showing an example of the processing procedure. Programs for executing the processing in FIG. 5 are stored in a storage region in the image processing device 100 or an appropriate external storage medium and are executed by the image processing device 100. This also applies to processes in flowcharts in FIGS. 6 to 9.

Figure 6:
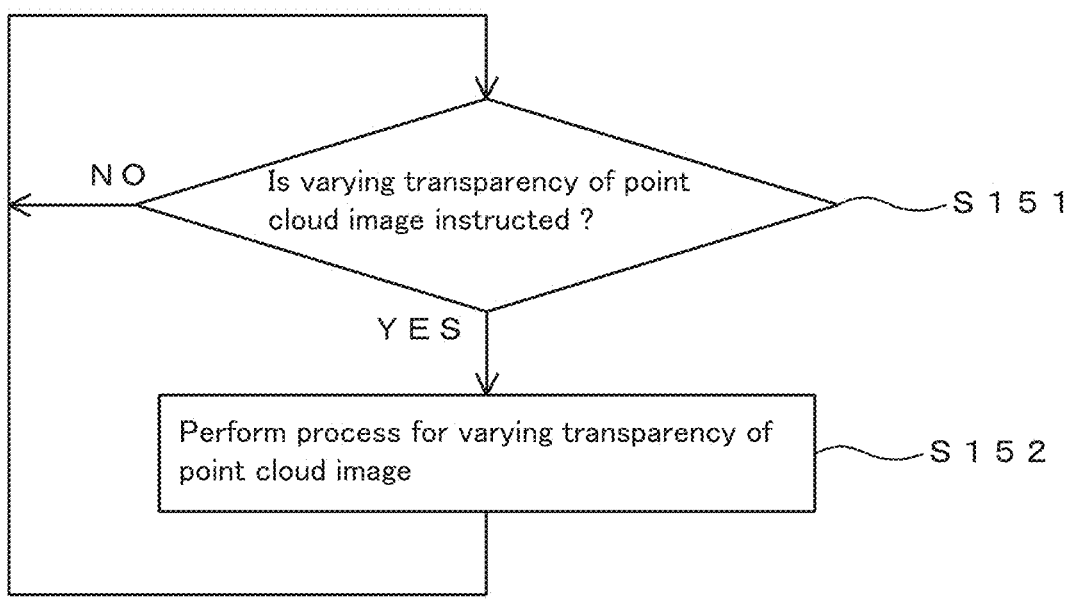
FIG. 6 is a flowchart showing an example of a processing procedure.
Figure 7:
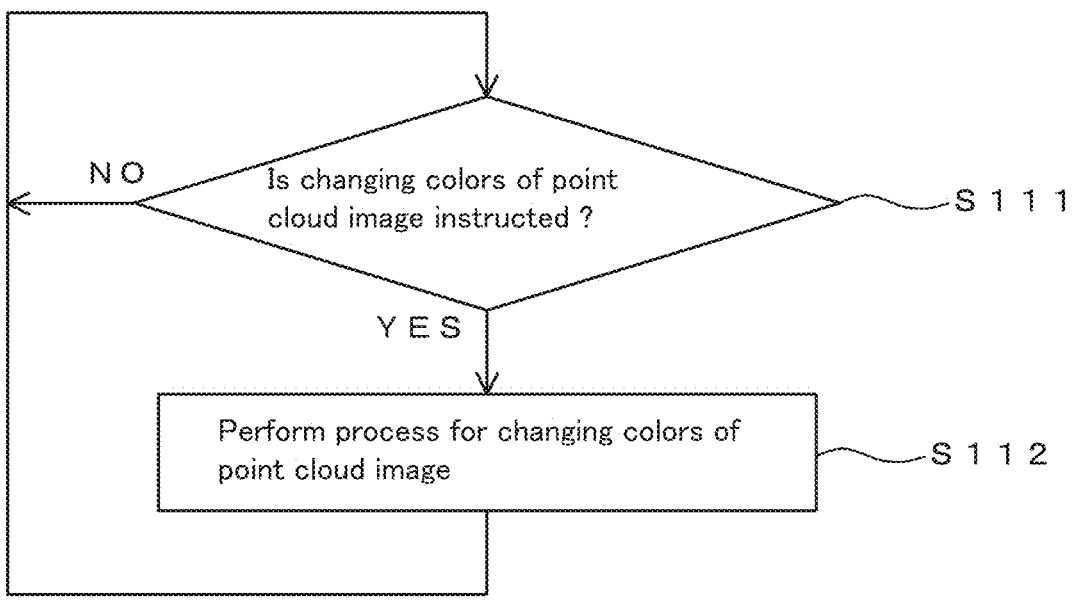
FIG. 7 is a flowchart showing an example of a processing procedure.
Figure 8:
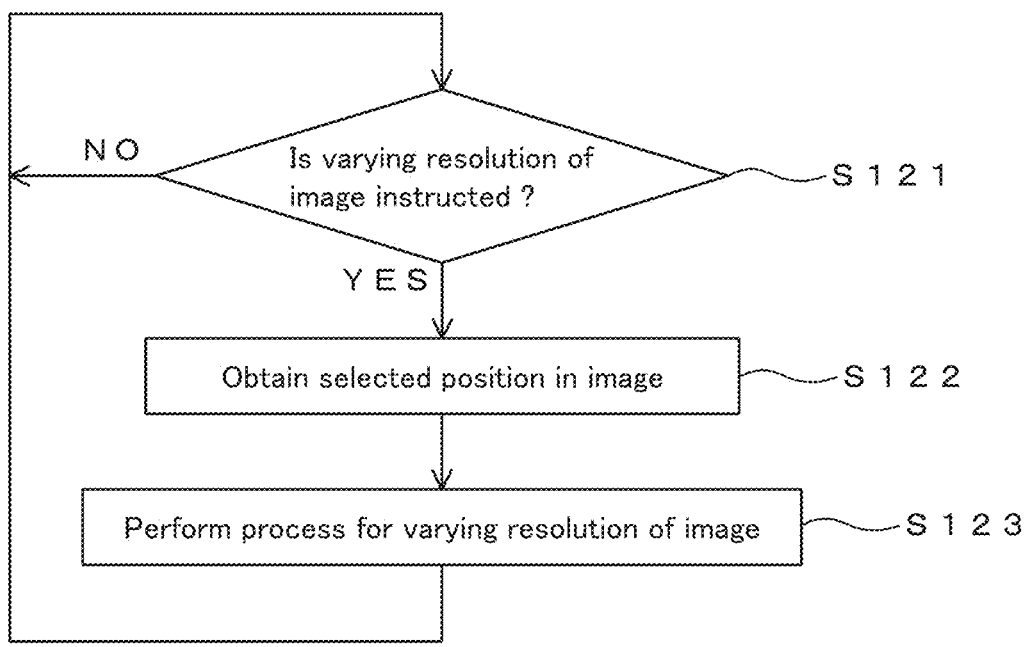
FIG. 8 is a flowchart showing an example of a processing procedure.

After the processing starts, data of still images, which are taken by the 360-degree spherical camera 200, is received (step S101). In this case, data of the still images respectively taken by the six cameras of the 360-degree spherical camera 200 is received. The image data may be retrieved from data, of which images are taken in advance and are preliminarily stored in an appropriate storage region, instead of obtaining the image data from the 360-degree spherical camera 200 in real time. This process is performed by the image data receiving unit 101 shown in FIG. 4. In addition, point cloud position data that is measured by the laser scanner 300 is obtained (step S102). This process is performed by the point-cloud-position data obtaining unit 103. The reception of the instruction from a user, which triggers the processings in FIGS. 6 to 8, can be performed at any timing after step S102. The processings in FIGS. 6 to 8 are described later.

Then, a radius "R" of a projection sphere is set at an initial value (step S103). A predetermined value is used as the initial value. After the radius "R" is set at the initial value, the projection sphere is set (step S104). The processes in steps S103 and S104 are performed by the projection sphere setting unit 106 shown in FIG. 4.

After the projection sphere is set, on the basis of the image data that is received in step S101, the still images are projected on an inner circumferential surface of the projection sphere that is set in step S104 to stitch the still images (step S105). The still images are taken by the six cameras equipped on the 360-degree spherical camera 200. The process in step S105 is performed by the panoramic image generating unit 107 shown in FIG. 4. The process in step S105 provides a panoramic image showing the surroundings as viewed from the center of the projection sphere. The data of the panoramic image that is obtained by the process in step S105 is output from the panoramic image generating unit 107 to the display 400, and the panoramic image is displayed on the display 400. The panoramic image generating unit 107 and the display 400 are shown in FIG. 4.

After the panoramic image is obtained, a point cloud image is superposed on the panoramic image to generate a superposed panoramic image (step S106). This process is performed by the image and point-cloud-image superposing unit 108. Examples of a displayed superposed image that is thus obtained are shown in FIGS. 11 to 13.

After the panoramic image and the superposed panoramic image, in which the point clouds are superposed on the panoramic image, are obtained, whether the selection receiving unit 102 receives selection of a new target point is judged (step S107). The new target point is the point "P" in the case shown in FIG. 3. If a new target point is selected, the processing advances to step S108. Otherwise, if no new target point is selected, the process in step S107 is repeated. For example, when the target point is not changed, the radius "R" that is set at this time is maintained.

When the target point is changed, the distance "r" (refer to FIG. 3) is calculated by the distance calculator 105 in FIG. 4 (step S108). The distance "r" is calculated as follows. First, the position of the target point in the panoramic image is identified. Next, the position of the target point is identified in the superposed panoramic image, in which the point cloud image is superposed on the panoramic image in the process in step S106, for example, in the image shown in FIG. 11. Thus, three-dimensional coordinates are obtained from the point cloud data at a position corresponding to the target point, for example, at the point "P" in FIG. 3. Then, a distance between the three-dimensional position of the target point and the position of the center of the projection sphere is calculated. For example, in the case shown in FIG. 3, the distance "r" between the point "P" and the center C0 is calculated.

After the distance "r" is calculated, the projection sphere is updated by setting radius "R"=distance "r" (step S109). After the radius "R" is recalculated, the process in step S105 and the subsequent steps is executed again by using the recalculated value of the radius "R". Consequently, the radius "R" (refer to FIG. 3) for the panoramic image to be displayed on the display 400 varies so that radius "R"=distance "r", and a superposed panoramic image is displayed in accordance with the varied value of the radius "R".

As described above, when the distance "r" varies due to the change of the target point, the radius "R" varies accordingly. That is, when the target point is changed, and the three-dimensional position of the target point is therefore changed, the radius of the projection sphere having the projection surface for the panoramic image varies dynamically. Thereafter, a superposed panoramic image that is changed correspondingly to the change in the projection sphere is displayed.

Processing for Varying Transparency of Point Cloud Image

The following describes an example of a flow relating to a processing for varying a transparency of the point cloud image of the laser scanning point clouds on the superposed panoramic image. FIG. 6 is a flowchart showing an example of a procedure of the processing. This processing involves judgment whether instruction for varying the transparency of the point cloud image is operated by a user (step S151).

The instruction relating to the transparency of the point cloud image is operated by a user by using a user interface, such as a graphical user interface (GUI) of the personal computer that serves as the image processing device 100. This also applies to other operations performed by a user.

If there is an instruction in step S151, the transparency is adjusted according to this instruction (step S152). For example, a panoramic image to which the point cloud image is superposed at the transparency of 0% is shown in FIG. 11, at the transparency of 65% is shown in FIG. 12, and at the transparency of 85% is shown in FIG. 13.

Processing for Changing Colors of Point Cloud Image

FIG. 7 shows an example of a processing relating to change of colors of the point cloud image. This processing involves judgement whether instruction for varying the colors of the point cloud image is operated by a user (step S111). Upon receiving an instruction to change colors, a process for changing the colors of the point cloud image is performed according to the instruction (step S112).

Processing for Varying Resolution of Image

FIG. 8 shows an example of a processing relating to varying the resolution of the photographed image. This processing involves judgement as to whether instruction for varying the resolution of the photographed image is made by a user (step S121). Upon receiving an instruction to vary the resolution, information at a selected position in the panoramic image or in the superposed panoramic image, that is, coordinates in the image on the display, is obtained (step S122). Then, the resolution is varied according to the instructed content (step S123). To vary the resolution, one photographed image that contains the selected part is selected from among the multiple photographed images composing the panoramic image. Alternatively or additionally, the resolution can also be varied in a region selected by a user.

Processing for Varying Density of Point Cloud Image

Figure 9:
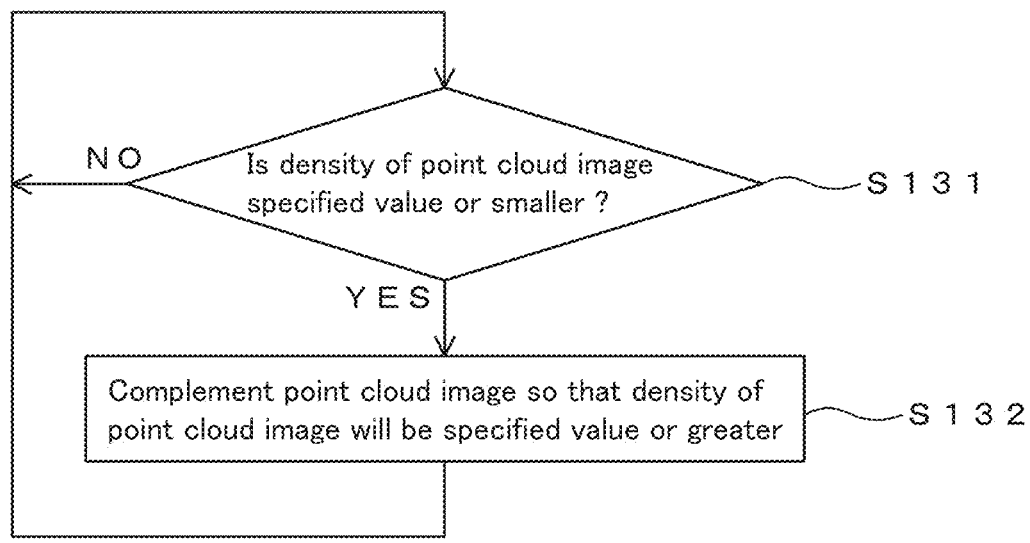
FIG. 9 is a flowchart showing an example of a processing procedure.

In a case in which a process for increasing the density of the point cloud image in a specific region is instructed, the processing in FIG. 9 is performed. The processing in FIG. 9 involves judgement whether the display density of the point clouds in the selected region is a specified value or smaller (step S131). If the display density of the point clouds is the specified value or smaller, a scanning point having the same color as adjacent scanning points, which have approximately the same reflection densities, is interpolated between the adjacent scanning points (step S132). This processing enables increase in the display density of the point clouds and facilitates visual recognition of an object represented by the point clouds.

Advantages

According to the principle shown in FIG. 3, the distance "r" is calculated when a target point "P" is selected, and the radius "R" is set so that radius "R"=distance "r". Consequently, deviations of the projected image for the position of the point "P" are corrected. When the position of the target point "P" is changed, and the distance "r" therefore varies, the radius "R" also varies correspondingly so that radius "R"=distance "r". Accordingly, high degree of clarity of the image for the target point "P" is maintained.

Although misalignments can occur between the photographed images and the point cloud image in addition to deviations between the photographed images, the misalignments between the photographed images and the point cloud image can also be corrected by adjusting the radius "R" of the projection sphere.

The deviations and the misalignments can be corrected at any position as desired by selecting a target point by using a cursor on the display. For example, as the cursor moves, the position that clearly shows an object also moves in the image accordingly.

The deviations between the photographed images are difficult to visually recognize when the point cloud image is superposed on the photographed images. The misalignments between the photographed images and the point cloud image depend on factors of objects in the photographed images, such as color, contrast, and definition, and also depend on the state of the point cloud image. In view of them, in this embodiment, the transparency of the point cloud image is made adjustable to facilitate visual recognition of deviations between the photographed images and also visual recognition of misalignments between the photographed images and the point cloud image, in accordance with the situation. In particular, since the transparency of the point cloud image is made adjustable, the displayed states of the photographed images and the point cloud image can be finely adjusted. Thus, the photographed images and the point cloud image, of which the relationship is easy to understand, are displayed to a user. This increases an efficiency of work such as generation of a three-dimensional model using a panoramic image.

The selection of the target point may be received by another method. For example, the panoramic image that is generated by the panoramic image generating unit 107 is displayed on a touch panel display, and this display may be touched using a stylus or other tool, whereby the selection of the target point is received.

In yet another method for receiving selection of the target point, the direction of gaze of a user viewing the panoramic image, which is generated by the panoramic image generating unit 107, is detected, and an intersection point of the direction of gaze and the image plane of the panoramic image is calculated. Then, the position of the intersection point is received as a selected position. This method allows dynamic adjustment of the radius of the projection sphere for clearly describing the image at the position at which the user gazes. Details of a technique for detecting a direction of gaze are disclosed in Japanese Unexamined Patent Application Laid-Open No. 2015-118579, for example.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A display controlling device for a survey image, comprising:
    a panoramic image generating unit that generates a panoramic image by stitching multiple still images having different points of view;
    a superposing unit that superposes an image of a laser scanning point cloud on the panoramic image, and the image of the laser scanning point cloud having a specific color; and
    a point-cloud-image transparency adjuster that adjusts a transparency of the image of the laser scanning point cloud to cause the laser scanning point cloud to be visually recognized while the panoramic image underlying the image of the laser scanning point cloud is visually recognized through the image of the laser scanning point cloud; and
    a point-cloud-image density adjuster that adjusts display density of the laser scanning point cloud at a specific position in the panoramic image, wherein, at a part in a front side in the panoramic image at which display density of scanning points of the laser scanning point cloud looks low compared to a distant part in the panoramic image, the point-cloud-image density adjuster interpolates a virtual scanning point between adjacent laser scanning points of the laser scanning point cloud, in such a manner that the display density of the scanning points of the part in the front side in the panoramic image has a specific value or greater.

2. The display controlling device for the survey image according to claim 1, further comprising a color setting unit that sets the specific color in accordance with one or both of differences in reflection intensity of laser scanning points of the laser scanning point cloud and color of the panoramic image at a part on which the laser scanning points are superposed.

3. The display controlling device for the survey image according to claim 2, wherein the color setting unit sets the specific color in accordance with one or both of differences in distance of laser scanning points of the laser scanning point cloud from a specific position and difference in origin of laser scanning that is performed to obtain the laser scanning points.

4. The display controlling device for the survey image according to claim 2, wherein the set specific color is changeable.

5. The display controlling device for the survey image according to claim 1, further comprising an image resolution adjuster that adjusts resolution of the still image at a specific position in the panoramic image.

6. A display controlling method for a survey image, comprising:
  generating a panoramic image by stitching multiple still images having different points of view;
  superposing an image of a laser scanning point cloud on the panoramic image, and the image of the laser scanning point cloud having a specific color; and
  adjusting a transparency of the image of the laser scanning point cloud to cause the laser scanning point cloud to be visually recognized while the panoramic image underlying the image of the laser scanning point cloud is visually recognized through the image of the laser scanning point cloud; and
  adjusting display density of the laser scanning point cloud at a specific position in the panoramic image,
  wherein, at a part in a front side in the panoramic image at which display density of scanning points of the laser scanning point cloud looks low compared to a distant part in the panoramic image, a virtual scanning point is interpolated between adjacent laser scanning points of the laser scanning point cloud in such a manner that the display density of the scanning points of the part in the front side in the panoramic image has a specific value or greater.

7. A non-transitory computer recording medium storing computer executable instructions for controlling displaying of a survey image, the computer executable instructions that, when executed by a computer processor, cause the computer processor to:
  generate a panoramic image by stitching multiple still images having different points of view;
  superpose an image of a laser scanning point cloud on the panoramic image, and the image of the laser scanning point cloud having a specific color; and
  adjust a transparency of the image of the laser scanning point cloud to cause the laser scanning point cloud to be visually recognized while the panoramic image underlying the image of the laser scanning point cloud is visually recognized through the image of the laser scanning point cloud; and
  adjust display density of the laser scanning point cloud at a specific position in the panoramic image,
  wherein, at a part in a front side in the panoramic image at which display density of scanning points of the laser scanning point cloud looks low compared to a distant part in the panoramic image, a virtual scanning point is interpolated between adjacent laser scanning points of the laser scanning point cloud in such a manner that the display density of the scanning points of the part in the front side in the panoramic image has a specific value or greater.

* * * * *